Jan. 9, 1934.  A. W. ABRAHAMSEN  1,943,252
SCRAPER
Filed Feb. 17, 1932
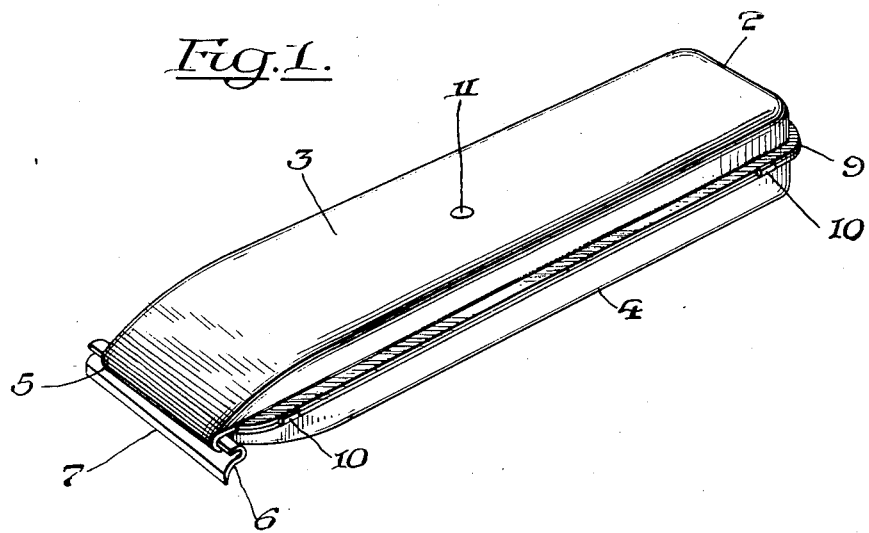
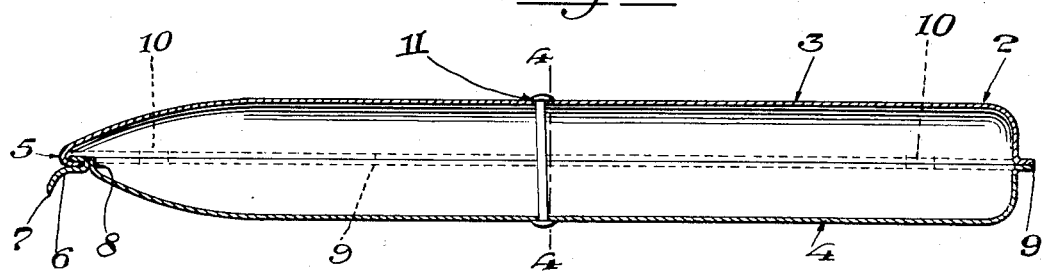
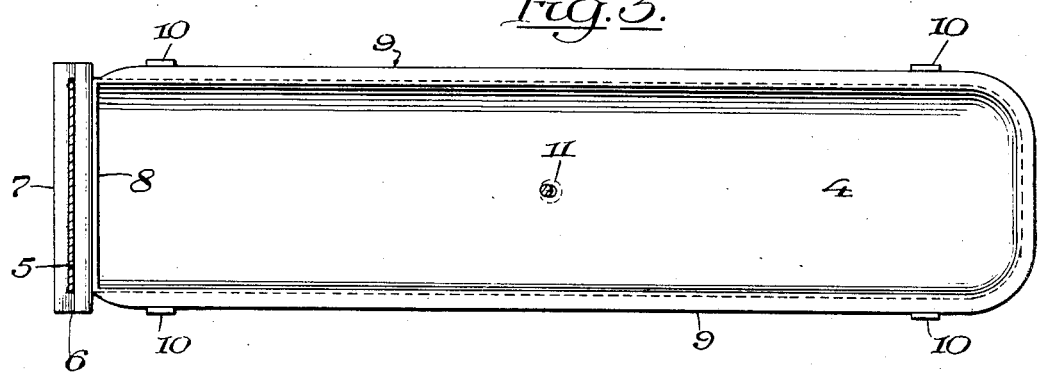
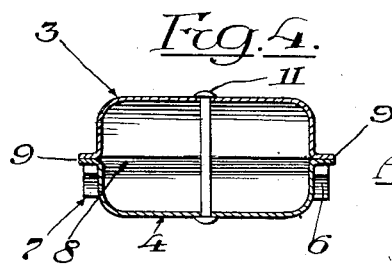
INVENTOR
Alfred W. Abrahamsen
BY
ATTORNEY Patented Jan. 9, 1934

1,943,252

UNITED STATES PATENT OFFICE 1,943,252

SCRAPER

Alfred W. Abrahamsen, Queens Village, N. Y., assignor to Hook Scraper Company, Incorporated, Queens Village, N. Y., a corporation of New York Application February 17, 1932. Serial No. 593,471

17 Claims. (Cl. 145—47)

This invention relates to scrapers for scraping various articles such as wood, painted surfaces, window glass and other surfaces, and to the method of making the same, the present invention being an improvement, in part, upon that shown and described in my United States Letters Patent No. 1,670,646, dated May 22, 1928, in that, while it can be used as a floor scraper and for scraping other surfaces of wood, it is also adapted for scraping painted surfaces and window glass and other surfaces, the object of the invention being to provide a small, inexpensive durable and practical scraper provided with a detachable cutter, and which can be manufactured and sold at a very low price.

In that patent, the cutter is secured to the holder or blade by curving the latter, thereby curving the cutter during its insertion into the holder or blade and while that construction has proved very successful, the curvature of the cutter somewhat limited it to cutters of a certain length. That is to say my patented cutter was not adaptable to a very short length of cutter as that cutter had to be sprung edgewise to secure it in position so that in order to make an appreciably smaller cutter than that of my patent the tension necessary to hold the cutter in the holder or shank had to be obtained through the medium of the handle or holder itself. Therefore, the present improvement has for its primary object, the provision of a scraper that has a different range of use while retaining the desirable detachable feature of the cutter. In that patent, the cutter is interlocked with the holder or blade, the interlock being maintained by the curvature of the blade. In the present improvement, the cutter is likewise interlocked with the holder or handle but is maintained in its interlocking position in such manner that the cutter may be straight from end to end, thus particularly adapting it for various uses.

In the drawing accompanying and forming a part of this specification, Fig. 1 is a perspective view of this improved scraper.

Fig. 2 is a longitudinal sectional view thereof.

Fig. 3 is an interior view of one part of the handle or holder, and

Fig. 4 is a cross-sectional view taken on line 4—4 of Fig. 2.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing, since the invention is capable of other embodiments, and that the phraseology which I employ is for the purpose of description and not of limitation.

In the preferred form thereof shown, the handle or holder 2 for the blade is shown of stamped metal, such as steel sheet metal, and comprises two parts, 3 and 4, part 3 having an inwardly bent under lip 5 forming a U-shaped front edge for the reception of a U-shaped detachable cutter 6, provided with a bent, sharpened edge 7, whereby the cutter may be interlocked endwise with its holder and readily removed in the same manner, thus permitting the cutter to be renewed when worn out or dull without delay or without the necessity of stopping to resharpen it. This cutter is straight from end to end, both before and after it is inserted in the holder.

For the purpose of holding the cutter firmly in working position, the other member 4 of the holder is made shorter than the member 3 and is provided with an upturned cutter engaging nose 8 adapted to contact with the rear wall of the U-shaped portion of the cutter and thus efficiently hold the cutter in place, and to facilitate the quick removal and replacement of the cutter, this edge is slightly rounded or curved in the direction of its length or transversity of the handle.

In the form shown, the handle is made hollow and therefore is light in weight, each of the two members of the handle having a flange or rim 9, one rim being provided with bent lugs 10 engaging the flange of the other member, whereby the two parts are prevented from shifting relatively to each other when centrally riveted together.

The two parts of the handle are riveted or otherwise secured together by a rivet 11 shown located substantially centrally of the handle, and as shown in Fig. 2, this rivet is slightly inclined, being located in the opening of the lower part 4 about one sixty-fourth of an inch to the rear of its location in the opening of the top part 3 with the result that when the rivet is headed, this forces the under part 4 forward so that the nose 8 thereof is forced against the channel of the cutter and thus firmly holds it in place since the hollow handle parts 3 and 4 act as a spring when the cutter is slipped into the channel of the holder formed by the lip 5 of the handle. While the rivet when headed has a tendency to move to a position perpendicular to the handle, yet it is sufficiently offset from the perpendicular to remain inclined thereto and thus exert a constant holding action on the cutter.

In other words, by thus locating the rivet in the manner shown and described, the positioning of the cutter in place causes the two parts of the handle to act as a spring and hold the cutter against slipping. Thus the construction provides a handle in which a spring tension is created for holding the cutter in place and it will be seen that by stamping from sheet metal or sheet steel, I have provided a convenient form of light weight handle which may be readily grasped by the user carrying a detachable cutter effectively held in place through the spring action of the handle itself while, at the same time permitting a detachable cutter to be used which may be straight from end to end, thus adapting the cutter to uses impossible with that described in my said patent.

It is to be understood that by describing in detail herein any particular form, structure of arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A scraper comprising a handle consisting of a pair of members, a cutter, interlocking means for the cutter carried by one member of the handle with the other member of the handle positioned to secure the cutter in interlocked position, and a rivet for securing the two members of the handle and located inclinedly to the longitudinal horizontal axis of the handle, thereby to force the members into engagement with the cutter.

2. A scraper comprising a two-part handle, one part shorter than the other and one part having a U-shaped end for the reception of a U-shaped portion of a detachable cutter, the nose of the shorter member of the handle being in position to engage the cutter and hold it in place, and means exerting a longitudinal spring action on the handle parts for holding said last handle member in contact with the cutter.

3. A scraper comprising a two-part handle, one part shorter than the other and one part having a U-shaped end for the reception of a U-shaped portion of a detachable cutter, the nose of the shorter member of the handle being in position to engage the rear edge of the cutter and hold it in place, and rivet means for holding said last handle member under longitudinal spring tension and in contact with the cutter.

4. A scraper comprising a two-part handle, one part shorter than the other and one part having a U-shaped end for the reception of a U-shaped portion of a cutter, the nose of the shorter member of the handle being in position to engage the cutter and hold it in place, and a rivet for securing the two parts of the handle under longitudinal tension, and located to hold the shorter member of the handle in contact with the cutter.

5. A scraper comprising a two-part handle, one part shorter than the other and one part having a U-shaped end for the reception of a U-shaped portion of the cutter, the forward end of the shorter member of the handle being in position to engage the cutter and hold it in place, and a rivet for securing said handle members together and inclinedly located relatively thereto toward the cutter to provide a spring action of the handle members on the cutter.

6. A scraper comprising a handle and a detachable cutter, said handle consisting of a pair of connected members, one shorter than the other, the longer member having a rearwardly bent end for the reception of the detachable cutter, the shorter member of the handle having an inwardly extending lip, and a rivet securing said members together and inclinedly located thereof to force the members into engagement with the cutter.

7. A scraper comprising a handle and a detachable cutter, said handle consisting of a pair of connected members, one shorter than the other, the longer member having a rearwardly bent end for the reception of the detachable cutter, the shorter member of the handle having an inwardly extending lip at its front end to engage the cutter, and means for securing said handle members together.

8. A scraper comprising a handle and a detachable cutter, said handle consisting of a pair of connected members, one shorter than the other, the longer member having a rearwardly bent end for the reception of the detachable cutter, the shorter member of the handle having an inwardly extending lip at its front end to engage the cutter, and means for securing said handle members together and comprising a rivet.

9. A scraper comprising a handle and a detachable cutter, said handle consisting of a pair of connected members, one shorter than the other, the longer member having a rearwardly bent end for the reception of the detachable cutter, the shorter member of the handle having an inwardly extending lip at its front end to engage the cutter, and means for securing said handle members together and bent lugs for preventing the shifting of the handle members.

10. A scraper comprising a two-part handle, a detachable cutter, means carried by one part of the handle for interlocking it with the cutter, means carried by the other part of the handle for holding the cutter in position, and means co-operating with both parts of the handle for holding the cutter in place and comprising a rivet inclined to the horizontal axis of the handle.

11. A scraper comprising a cutter and a two-part handle, one member having means for interlocking the handle with the cutter, the other member having means for engaging the cutter and holding it in its interlocked position, and means co-operating with both members of the handle for forcing the last member forward relative to its companion member, thereby to hold the cutter in position.

12. A scraper comprising a cutter and a two-part handle, one member having means for interlocking the handle with the cutter, the other member having means for engaging the cutter and holding it in its interlocked position, and means co-operating with both members of the handle for forcing the last member forward relative to its companion member, thereby to hold the cutter in position and comprising a rivet, located inclined to the two members of the handle.

13. A scraper comprising a two-part handle and a cutter, the cutter comprising a straight grooved-formed portion and a bent cutting edge and the handle having means at its forward edge for interlocking the cutter in position, and means carried by the handle for holding the cutter in interlocking engagement with the handle and comprising a handle portion having its forward edge in engagement with the cutter, and means for forcing the handle parts in opposed longitudinal direction thereby to hold the cutter in position.

14. A scraper comprising a two-part handle and a detachable blade, said handle and blade having interlocking means for connecting them, one part of said handle having a spring action in the direction of its length and having means for engaging the rear edge of the blade for holding it in its interlocked position.

15. A scraper comprising a two-part handle and a detachable blade, said handle and blade having interlocking means for connecting them, one part of said handle having a spring action in the direction of its length and having means for engaging the rear edge of the blade for holding it in its interlocked position, the engaging means comprising a curved nose at the forward end of the spring acting part of the handle.

16. A scraper comprising a two-part handle, one part shorter than the other and having their front ends formed to oppose each other for securing a detachable blade therebetween, one part having means for interlocking the blade therewith and means for holding said opposed portions in position to clamp the blade in its interlocked position, said means exerting a lengthwise tension on the front portion of one handle part and a compressible action on the front portion of the other handle part.

17. A scraper comprising a two-part elongated handle, a detachable blade, means carried by the handle for holding the blade in position, and means inclined to the longitudinal axis of the handle for clamping the first named means in engagement with the blade.

ALFRED W. ABRAHAMSEN.